United States Patent
Chen

(10) Patent No.: US 8,942,234 B2
(45) Date of Patent: Jan. 27, 2015

(54) DAD-NS TRIGGERED ADDRESS RESOLUTION FOR DOS ATTACK PROTECTION

(71) Applicant: Telefonaktiebolaget L M Ericsson (publ), Stockholm (SE)

(72) Inventor: Ing-Wher Chen, McLean, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/103,800

(22) Filed: Dec. 11, 2013

(65) Prior Publication Data

US 2014/0101760 A1  Apr. 10, 2014

Related U.S. Application Data

(63) Continuation of application No. 13/366,141, filed on Feb. 3, 2012, now Pat. No. 8,625,421.

(51) Int. Cl.
*H04L 12/28* (2006.01)
*H04L 29/06* (2006.01)
*H04L 29/12* (2006.01)

(52) U.S. Cl.
CPC .......... *H04L 63/1458* (2013.01); *H04L 61/103* (2013.01); *H04L 61/6059* (2013.01); *H04L 61/2092* (2013.01); *H01L 61/6009* (2013.01)
USPC .......................................... 370/389; 370/401

(58) Field of Classification Search
None
See application file for complete search history.

(56) References Cited

U.S. PATENT DOCUMENTS

| 6,172,981 | B1 * | 1/2001 | Cox et al. | 370/401 |
|---|---|---|---|---|
| 7,729,284 | B2 * | 6/2010 | Ukrainetz et al. | 370/254 |
| 7,843,845 | B2 * | 11/2010 | Sridhar et al. | 370/252 |
| 8,438,390 | B2 * | 5/2013 | Perez | 713/168 |
| 8,467,297 | B2 * | 6/2013 | Liu et al. | 370/238 |
| 2007/0201474 | A1 * | 8/2007 | Isobe | 370/392 |
| 2009/0024758 | A1 * | 1/2009 | Levy-Abegnoli et al. | 709/237 |
| 2010/0128729 | A1 * | 5/2010 | Yazaki et al. | 370/392 |
| 2011/0153722 | A1 * | 6/2011 | Choudhary et al. | 709/203 |
| 2012/0331542 | A1 | 12/2012 | Halpern | |

OTHER PUBLICATIONS

I. Gashinsky et al., "Operational Neighbor Discovery Problems draft-ietf-v6ops-v6nd-problems-00," v6ops, Oct. 24, 2011, 13 pages.

(Continued)

*Primary Examiner* — Hong Cho
(74) *Attorney, Agent, or Firm* — Blakely Sokoloff Taylor & Zafman

(57) ABSTRACT

A first network element that receives an appropriation message from a second network element that indicates a target address which the second network element intends to appropriate for its use. In response to the appropriation message, the first network element broadcasts a discovery message to a plurality of network elements on the network to request a link-layer address in association with the first target address. The first network element receives a discovery response from the second network element with the first target address and the link-layer address of the second network element. Then the first network element updates a neighbor cache to include a pre-cached neighbor cache entry associating the link-layer address to the first target address. This prevents one or more future neighbor cache misses associated with the first target address.

21 Claims, 5 Drawing Sheets

(56) References Cited

OTHER PUBLICATIONS

J. Halpern, "Mitigating Neighbor Discovery Based Denial of Service Attacks draft-halpern-6man-nddos-mitigation-00," Network Working Group, Oct. 17, 2011, 6 pages.

W. Kumari et al., "Operational Neighbor Discovery Problems and Enhancements, draft-gashinshky-v6nd-enhance-00," Network Working Group, Jun. 29, 2011, 16 pages.

T. Narten et al., "Neighbor Discovery for IP version 6 (IPv6)," Network Working Group, Sep. 2007, 98 pages.

P. Nikander et al., "IPv6 Neighbor Discovery (ND) Trust Models and Threats," May 2004, 23 pages, Network Working Group, Request for Comments: 3756, The Internet Society.

Z. Shelby et al., "Neighbor Discovery Optimization for Low Power and Lossy Networks (6LoWPAN) draft-ietf-6lowpan-nd-18," Oct. 24, 2011, 59 pages, 6LoWPAN Working Group, Internet-Draft, IETF Trust and the persons identified as the document authors.

S. Thomson et al., "IPv6 Stateless Address Autoconfiguration," Network Working Group, Sep. 2007, 30 pages.

* cited by examiner

DAD-NS TRIGGERED ADDRESS RESOLUTION FOR DOS ATTACK PROTECTION

CROSS-REFERENCE TO RELATED APPLICATIONS

This application is a continuation of application Ser. No. 13/366,141, filed Feb. 3, 2012, which is hereby incorporated by reference.

FIELD

Embodiments of the invention relate to the field of computer networking; and, more specifically, to triggering address resolution in a network utilizing neighbor discovery protocols.

BACKGROUND

In Internet Protocol Version 6 (IPv6), techniques are introduced for network elements to discover the presence of other network elements on the same link and corresponding attributes for those network elements. This protocol, known as Neighbor Discovery (ND) for IPv6 (IPv6 ND), enables a network element to discover IPv6 addresses and link layer addresses of its neighbor network elements. Furthermore, techniques introduced in conjunction with IPv6 ND allow a network element to autoconfigure an IP address on an interface and perform Duplicate Address Detection (DAD) prior to utilizing that IP address on the network. The DAD procedure ensures that the autoconfigured IP address is unique, not utilized by another interface on the network.

As described in the Internet Engineering Task Force (IETF) standards track Request for Comments (RFC) *Neighbor Discovery for IP version 6 (IPv6)*, by T. Narten et al. (September 2007), as a network element uses IPv6 ND to discover its neighbor's attributes, a neighbor cache (NC) is filled with NC entries, keyed on the neighbor's IPv6 address, containing information such as link-layer address, reachability state, and a time to a next Neighbor Unreachability Detection event.

As a network element generates, or retransmits, packets destined for a neighbor, the network element looks up the destination's IP address in the NC and utilizes a corresponding entry to determine the link-layer address of the destination. However, the network element may lookup an IP address that is not in the NC, which results in a NC miss. In response to a NC miss, the network element broadcasts a neighbor solicitation (NS) message to request the link-layer address of the destination. Many implementations of the IPv6 ND protocol generate an incomplete, or unresolved, NC entry for the destination while waiting for a response from the destination. The maintenance of a NC can be further explained with reference to existing operations in FIG. 1.

FIG. 1 is a flow diagram illustrating prior art operations for handling IPv6 neighbor discovery. In FIG. 1, three network elements are shown as 101, 103, and 104. Network elements 103 and 104 are part of a network 102 while network element 101 exists outside of network 102. Network element 103 is a network element such as a router, or gateway, between network element 101 and network element 104. As such, packets arriving from network element 101 that are destined for network element 104 are relayed by network element 103.

In FIG. 1, network element 104 transmits a Neighbor Solicitation message intended for duplicate address detection (a DAD-NS message) at step 105 that includes a target address (TA) which the network element 104 intends to assign to its interface with network 102. A DAD-NS message is an NS message used to perform duplicate address detection (DAD), and such an NS messages contains a specified (non-zero) target IP address (TA) with an unspecified (zero) source IP address, without the source link-layer address option. It is a broadcast message to other nodes on the network and the specified TA indicates the IP address the network element will be assigning to its interface on that network. Unless the network element receives a neighbor advertisement (NA) message that contains the same TA, indicating another network element is using that address, then the network element may utilize the TA on its interface. In FIG. 1, the TA at step 105 is noted as 2001::234/128 which is common IPv6 address notation starting with 2001, ending with 234, and containing zeros between as indicated by the double colon. After transmitting the DAD-NS message, network element 104 waits a period of time to wait for an NA indicating the TA is being used by another node. This is the DAD timer period 110. Assuming that an NA is not received for the TA, then the network element 104 assigns the address 2001::234/128 to its interface in step 115.

As illustrated in FIG. 1, prior to, during, or after the assigning of the interface address in step 115, a packet arrives at network element 103 destined for the address 2001:234/128 in step 120. In response to receiving the packet and determining that it needs to relay that packet to a network element (i.e., node) on its network, network element 103 checks its NC for an entry matching the address with a corresponding link-layer address. In this instance, the NC does not have this entry as it has not yet been created and thus a NC miss event occurs on address 2001::234/128 at step 125. In response to the NC miss event, network element 103 adds an empty entry, also known as an incomplete entry or unconfirmed entry, into the NC with an IP address of 2001::234/128 in step 130 and broadcasts an NS message with a target address of 2001::234/128 in step 135. Unlike the DAD-NS in 105, this NS contains a target address of 2001::234/128 and a source IP address of the interface belonging to network element 103 in network 102, and also contains a source link-layer address of the interface belonging to network element 103 if the link layer has addresses. In response to the NS message, network element 104, assuming it has already performed step 115, responds with an NA message indicating its target address of 2001:: 234/128 and its link-layer address, shown as DE:EB:AA:5F: C4:02, in step 140. In response to receiving the NA message from step 140, network element 103 is able to update its NC entry corresponding with the IP address 2001::234/128 to associate the received link-layer address of DE:EB:AA:5F: C4:02 in step 145; thereby, associating the IP address and link-layer address to network element 104. Using this newly discovered association, the network element 103 is able to route the packet received at step 120 to network element 104 using the link-layer address of DE:EB:AA:5F:C4:02 in step 150.

Similarly, FIG. 1 illustrates that a second packet arrives from network element 101 at network element 103 in step 155. This packet is destined for the IP address 2001::285/128. In response to receiving the packet and determining that it needs to relay that packet to a network element on its network, network element 103 checks its NC for an entry matching the IP address with a corresponding link-layer address. In this instance, the NC does not have this entry for address 2001:: 285/128 and, thus, experiences a NC miss event at step 160. In response to the NC miss event, network element 103 adds an empty entry into the NC with an IP address of 2001::285/128 in step 165 and broadcasts an NS message with a TA of 2001::285/128 in step 170. However, there will be no reply NA message with a TA of 2001::285/128 because there are no network elements with that IP address in network 102.

Thus, as noted by the Internet Draft *Mitigating Neighbor Discovery Based Denial of Service Attacks*, by J. Halpern (October 2011), there exists a potential that the NC will be filled with incomplete NC entries for many unresolved neighbors. The draft further asks whether NC misses are necessary. If NC misses can be ignored, then an off-link flooding denial of service (DoS) attack that uses NC misses to kill a router can be neutralized. For example, one technique to eliminate the need for NC misses is to, for each resolved neighbor, the IPv6 ND protocol actively monitors the reachability of that neighbor by extending the lifetime of the neighbor entry for that neighbor through periodic NS messages and retains the neighbor entry in the NC for as long as the neighbor entry's lifetime has not expired.

Another potential issue arises when a network element rate limits the NC miss events. In this scenario, many NC miss events may occur but the network element limits the number of acknowledged NC miss events, i.e. limits the number of events to which the network element reacts. As such, the network element may receive legitimate or illegitimate traffic including IP address that are not in the NC. In such a scenario, the network element may react to very few NC miss events to the exclusion of learning the link-layer address of the legitimate traffic.

SUMMARY

A method performed by a first network element coupled with a plurality of other network elements for pre-filling a neighbor cache in the first network element with a plurality of reachable neighbor cache entries each entry to associate an internet protocol (IP) address with a link-layer address. The first network element receives an appropriation message from a second network element of the plurality of other network element that indicates a first target address which the second network element intends to appropriate for its use. In response to the appropriation message, the first network element broadcasts a discovery message to the plurality of other network elements, wherein the discovery message indicates the first target address and is broadcast to request a link-layer address in association with the first target address. The first network element receives a discovery response from the second network element with the first target address and the link-layer address of the network element. Then the first network element updates the neighbor cache to include a pre-cached neighbor cache entry associating the link-layer address to the first target address, whereby one or more future neighbor cache misses associated with the first target address is prevented.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
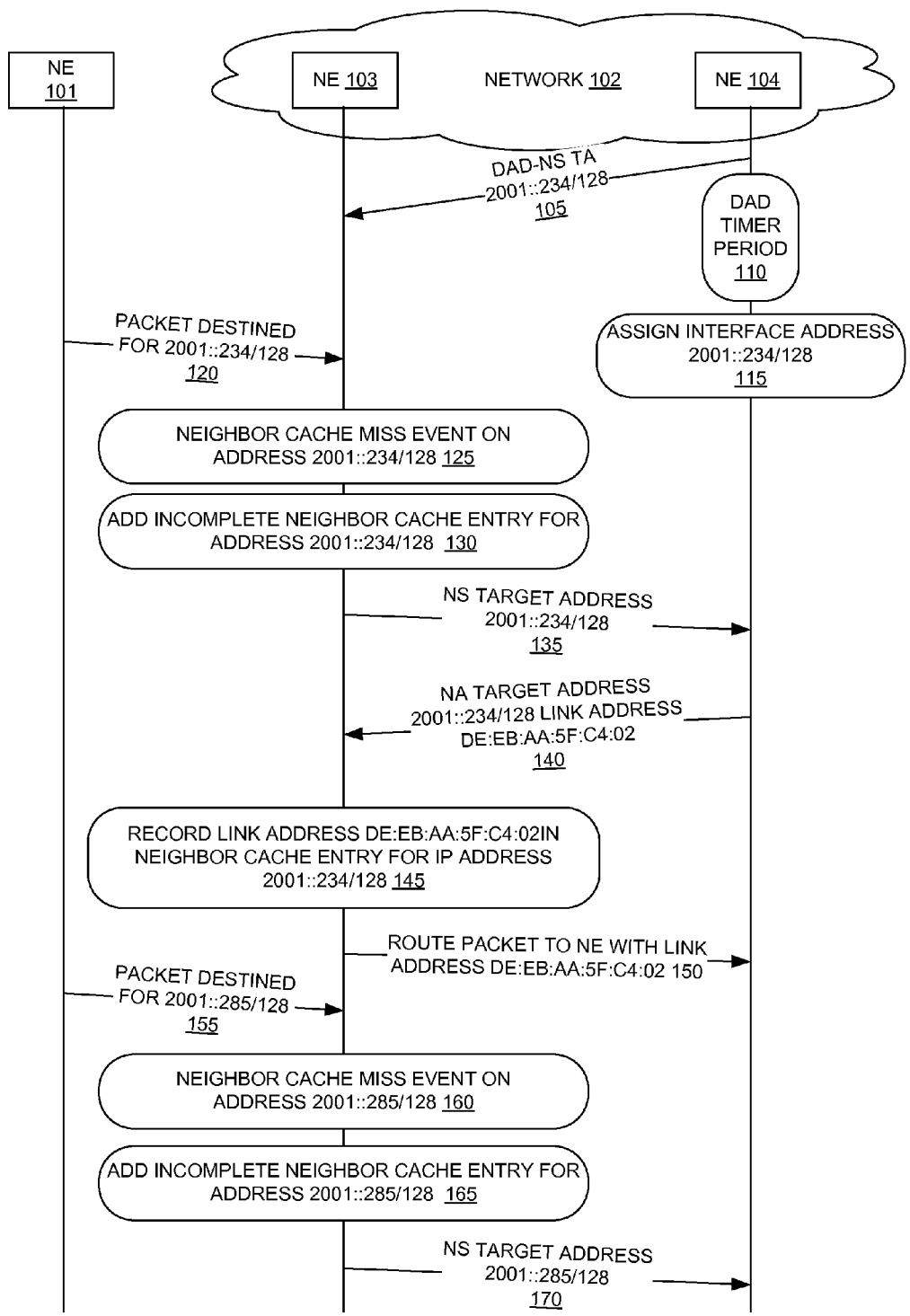
FIG. 1 is a flow diagram illustrating prior art operations for handling neighbor discovery.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge also referred to as a network device or network node) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

As described above, it is desirable to provide a solution to the problem of filling the NC with incomplete entries or the problem of encountering many NC miss events for legitimate traffic, to which the network element may or may not be properly react. As described above, if NC misses can be ignored, then an off-link flooding denial of service (DoS) attack that use NC misses to kill a router can be neutralized. As such, embodiments of the invention provide mechanisms to add reachable entries to the NC to preempt NC miss events for reachable nodes coupled with the network element. In this way, in one embodiment, NC misses are ignored by the network element. In this way, the NC will contain valid entries and would not be full of only invalid entries in the case of a DoS attack based on packets addressed to unassigned or unreachable destination IP addresses. Furthermore, in the case of rate limiting NC miss events, the network element would already contain an IP address to link-layer address association for reachable nodes thus avoiding the NC miss event entirely for those entries.

Figure 2:
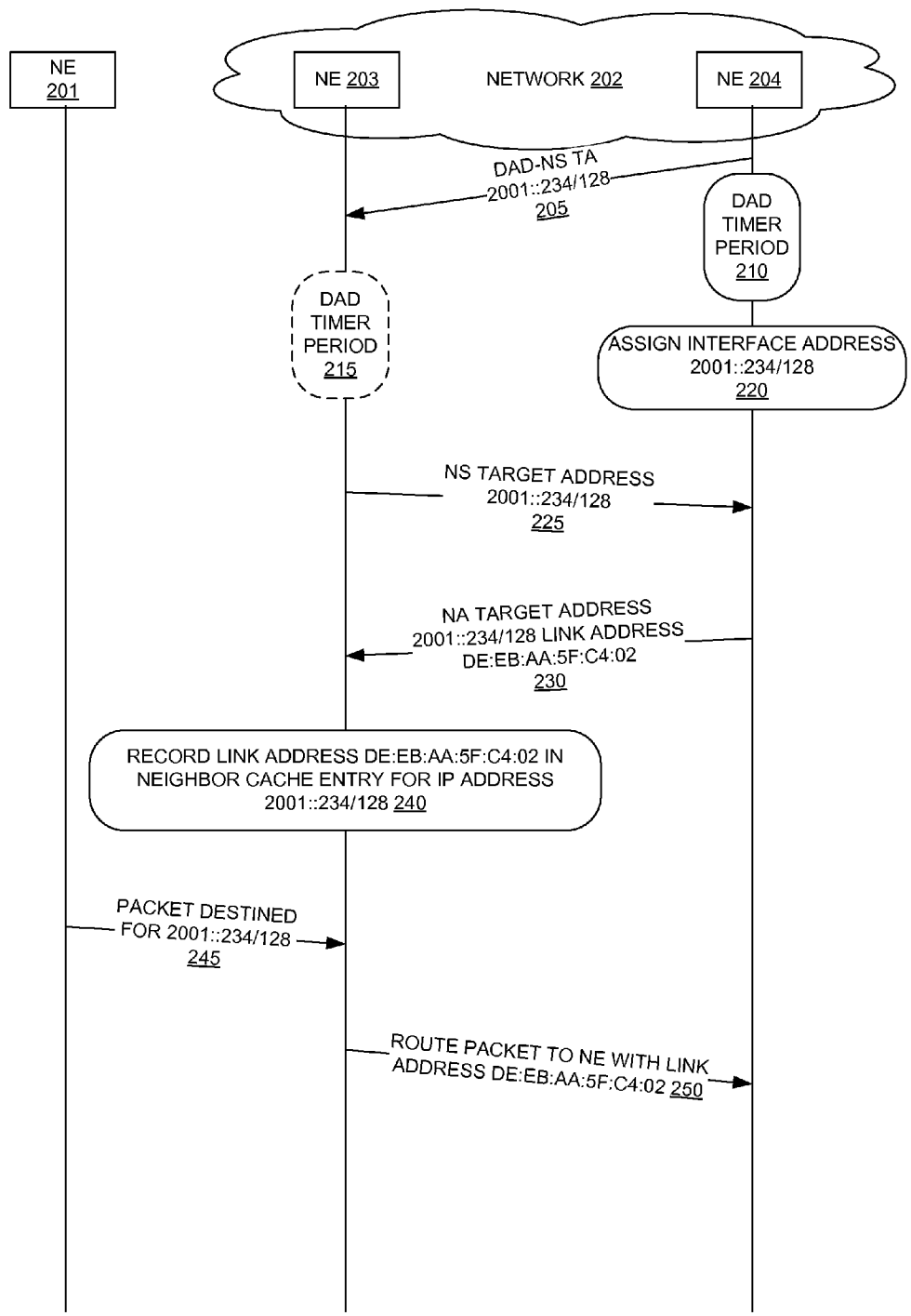
FIG. 2 is a flow diagram that illustrates exemplary operations for adding entries preemptively to a neighbor cache in response to duplicate address detection neighbor solicitation messages.

FIG. 2 is a flow diagram that illustrates exemplary operations for adding entries preemptively to a neighbor cache in response to duplicate address detection neighbor solicitation messages. In FIG. 2, three network elements are shown as 201, 203, and 204. Network elements 203 and 204 are part of a network 202 while network element 201 exists outside of network 202. Network element 203 is a network element such as a router, or gateway, between network element 201 and network element 204. As such, packets arriving from network element 201 that are destined for network element 204 are relayed by network element 203.

In FIG. 2, network element 204 transmits a DAD-NS message at operation 205 that includes a TA of 2001::234/128 which the network element 204 intends to assign to its interface with network 202. After transmitting the DAD-NS message, network element 204 waits a period of time for an NA indicating the TA is being used by another node, this is the DAD timer period 210. Assuming that no NA is received for the TA, then the network element 204 assigns the address 2001::234/128 to its interface in operation 220.

Network element 203 receives the DAD-NS message from network element 204. In one embodiment, the network element 203 also waits a DAD timer period 215 before proceeding. In operation 225, the network element 203 broadcasts an NS message with a target address of 2001::234/128. This message is sent to determine the link-layer address of a network interface of a network element to the network 202 that is assigned the target IP address 2001::234/128 because the network element 203 would like to fill its NC with a reachable entry it anticipates it might need in the future based on recognizing that a node initialized an interface with that TA from the DAD-NS message.

In response to the NS message, network element 204 transmits an NA message indicating its target address of 2001::234/128 and link-layer address, shown as DE:EB:AA:5F:C4:02, in operation 230. In response to receiving the NA message from operation 230, network element 203 records the received link-layer address of DE:EB:AA:5F:C4:02 in the NC to associate it with the corresponding with the IP address 2001::234/128 in operation 240; thereby, pre-caching an association between the link-layer address and the IP address prior to any NC miss event for that IP address. In one embodiment, the recordation of the link-layer address is performed along with updating an NC entry to the reachable state. Optionally, the network element 203 may only react to DAD-NS messages that include a TA that matches prefixes that network element 203 has advertised specifically for Stateless Address Auto Configuration (SLAAC).

As illustrated in FIG. 2, at some point after updating the NC in operation 240, a packet arrives at network element 203 destined for the address 2001:234/128 in operation 245. In response to receiving the packet and determining that it needs to relay that packet to a node on its network, network element 203 checks its NC for an entry matching the address with a corresponding link-layer address. Using the pre-cached NC entry, the network element 203 is able to route the packet received at operation 245 to network element 204 using the link-layer address of DE:EB:AA:5F:C4:02 in operation 250.

In one embodiment, not illustrated, the network element 203 may determine that the TA in the DAD-NS message is already assigned to an interface of another network element within the network 202. This may occur because the network element 203 already has a reachable entry in the NC for the TA of 2001::234/128. Further, it may be that the network element 203 receives an NA message with the TA of 2001::234/128 that indicates that TA is already being used. In either case, network element would not need to react to the DAD-NS message, and may in fact not even start the DAD timer period, since the network element 204 will need to attempt a second DAD-NS message with a new TA. Though in the embodiment in which the network element 203 receives an NA message, the network element 203 may update its NC to reflect the IP address to link-layer address association included within that NA though the network element did not initiate an NS message.

In another embodiment, network element 203 continuously monitors neighbor reachability of neighbors included in the NC to retain resolved neighbors. Thus, the network element 203 can minimize, if not eliminate, NC miss events of reachable neighbors to further neutralize off-link flooding DoS attacks.

Figure 3:
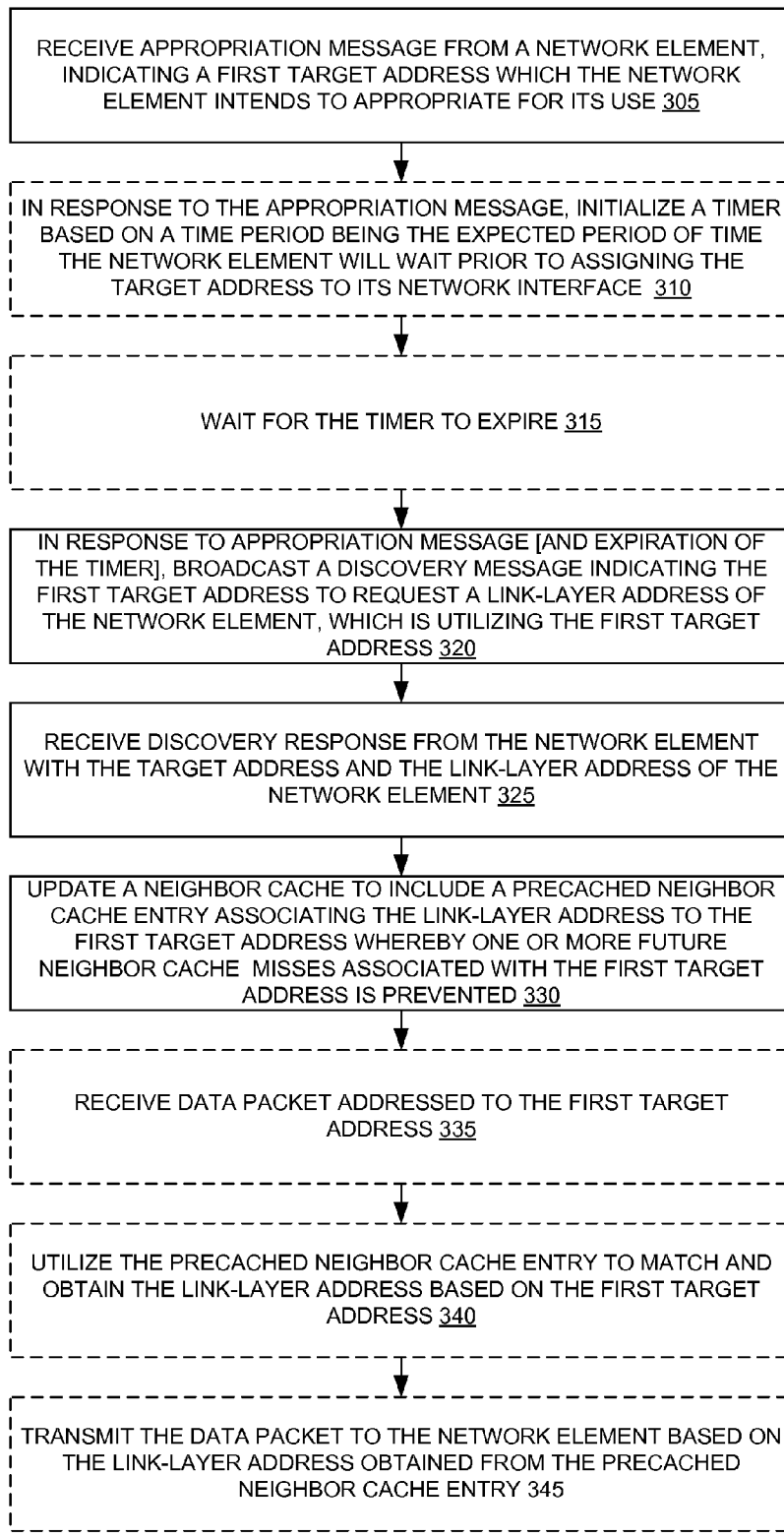
FIG. 3 illustrates a flow diagram that illustrates exemplary operations for adding entries preemptively to a neighbor cache in response to address appropriation messages.

FIG. 3 illustrates a flow diagram that illustrates exemplary operations for adding entries preemptively to a neighbor cache in response to address appropriation messages. In FIG. 3, a first network element is operating on a network comprised of at least a second network element. At operation 305, the first network element receives an appropriation message from the second network element indicating the second network element intends to appropriate a first TA which is included in the appropriation message for its use. For example, the appropriation message may be a DAD-NS message with reference to IPv6 ND. At operation 310, the first network element optionally initializes a timer in response to the appropriation message. This timer is based on a time period being the expected period of time which the second network element will wait prior to assigning the first TA to its network interface. This time period is often configured such that the second network element will wait a long enough period of time to receive some conflict message should another device be utilizing the first TA. In an embodiment utilizing a timer, the first network element waits for the timer to expire prior to continuing in operation 315. In response to the appropriation message, and optionally the expiration of the timer, the first network element broadcasts a discovery message indicating the first TA at operation 320. The discovery message acts as mechanism for the first network element to request details of the device that is utilizing the first TA, in this case the second network element. For example, the first network element may desire the link-layer address of the second network element. With reference to the previously describe IPv6 ND protocol, this message is an NS message indicating the first TA (and the source IP address of the first network element). Sometime later, the first network element receiving a discovery response from a device on the network that is utilizing the first TA at operation 325. This discovery response includes at least the first TA and the link-layer address of the responding network device, which in this case is the second network element. With reference to the previously describe IPv6 ND protocol, this message is an NA message indicating the first TA and the second network element's link-layer address. In response to the discovery response, the first network element updates its NC to include a pre-cached NC entry associating the link-layer address and the first TA at operation 330. This preemptive determination the link-layer address to IP address association prevents at least one future NC miss associated with that IP address. For example, it may be that sometime after the preemptive caching of the NC entry the first network element receives a data packet from another network element that is addressed to the second network element via the first TA, which is an IP address, at operation 335. The first network element can then utilize the pre-cached NC entry to match and obtain the link-layer address based on the first TA in operation 340. In operation 345, the first network element can then transmit the data packet to the second network element based on the link-layer address obtained from the pre-cached NC entry in operation 345.

Figure 4:
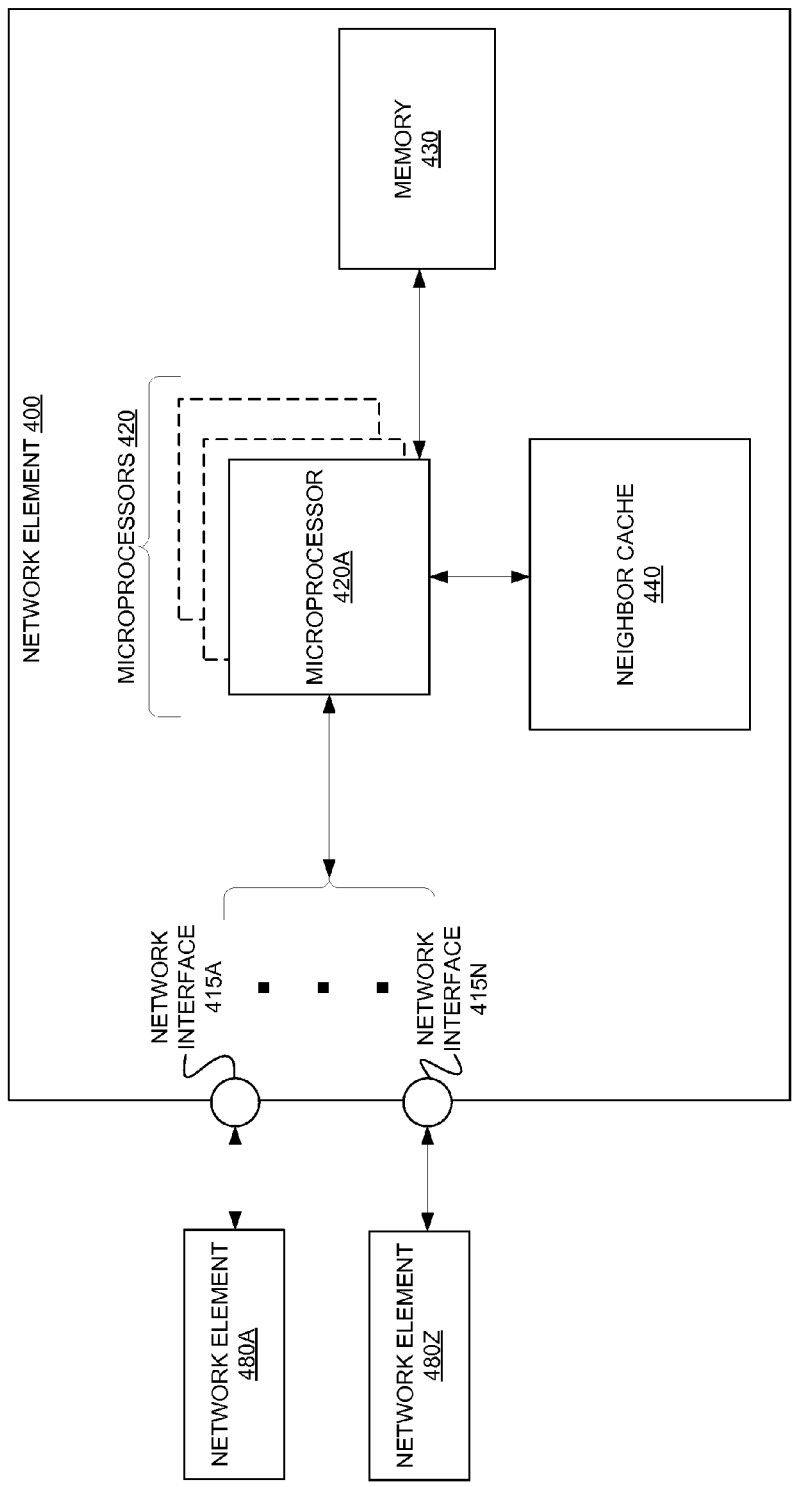
FIG. 4 illustrates a block diagram of an exemplary first network element coupled with a second network element and a third network element according to embodiments of the invention.

FIG. 4 illustrates a block diagram of an exemplary first network element coupled with a second network element and a third network element according to embodiments of the invention. In FIG. 4, the first network element 400 and at least the second network element 480A are enabled to utilize the discovery requests and discovery responses as previously described, such as the IPv6 ND protocol. Network element 400 comprises a set of one or more microprocessor units 420 that are coupled with a memory 430 and a neighbor cache 440. In one embodiment, the neighbor cache (NC) 440 is specialized memory, such as a content-addressable-memory (CAM) for looking up entries by IP address. In another embodiment, the NC 440 is a set of memory locations within memory 430 that comprise the NC entries. Still further embodiments may utilize specialized data structures or storage devices to comprise the NC. The set of microprocessors 420 are further coupled with a plurality of network interfaces 415A-415N that coupled the first network element 400 with the second network element 480A and the third network element 480Z.

Figure 5:
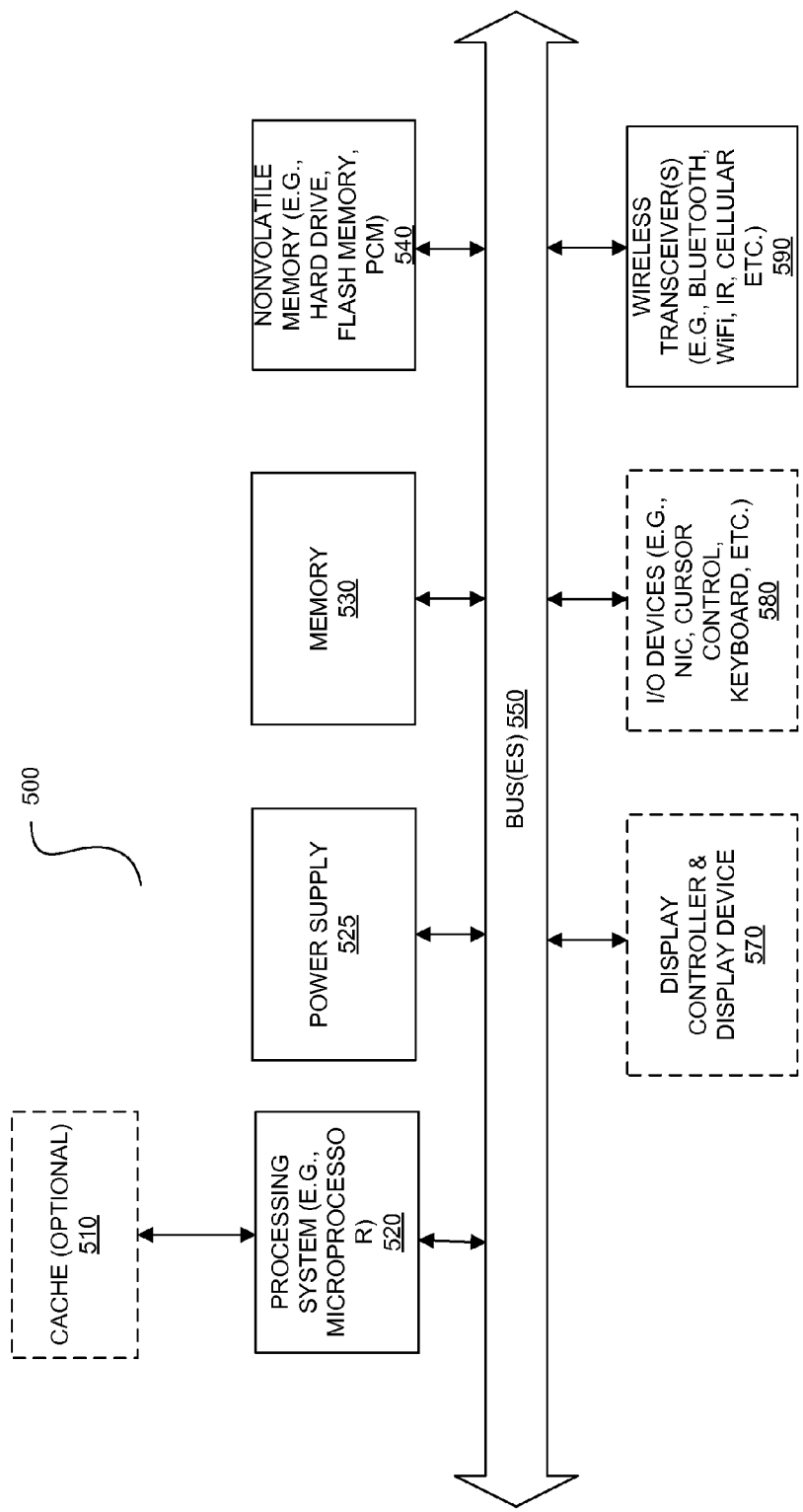
FIG. 5 illustrates a block diagram of an exemplary computer system according to embodiments of the invention.

FIG. 5 illustrates a block diagram of an exemplary computer system according to embodiments of the invention. Those skilled in the art would recognize that other computer systems used to implement network elements may have more or less components and may be used to in embodiments of the invention.

The computer system 500 includes a bus(es) 550 which is coupled with a processing system 520, a power supply 525, volatile memory 530 (e.g., double data rate random access memory (DDR-RAM), single data rate (SDR) RAM), non-volatile memory 540 (e.g., hard drive, flash memory, Phase-Change Memory (PCM). The processing system 520 may be further coupled to a processing system cache 510. The processing system 520 may retrieve instruction(s) from the volatile memory 530 and/or the nonvolatile memory 540, and execute the instruction to perform operations described above. The bus(es) 550 couples the above components together and further couples a display controller 570, one or more input/output devices 580 (e.g., a network interface card, a cursor control (e.g., a mouse, trackball, touchscreen, touchpad, etc.), a keyboard, etc.), and, optionally, one or more wireless transceivers 590 (e.g., Bluetooth, WiFi, Infrared, etc.). In one embodiment, the display controller 570 is further coupled to a display device.

As described herein, instructions may refer to specific configurations of hardware such as application specific integrated circuits (ASICs) configured to perform certain operations or having a pre-determined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals such as carrier waves, infrared signals, digital signals). In addition, such electronic devices typically include a set of one or more microprocessors coupled to one or more other components, such as one or more storage devices (non-transitory machine-readable storage media), user input/output devices (e.g., a keyboard, a touchscreen, and/or a display), and network connections. The coupling of the set of microprocessors and other components is typically through one or more busses and bridges (also termed as bus controllers). Thus, the storage device of a given electronic device typically stores code and/or data for execution on the set of one or more microprocessors of that electronic device. Of course, one or more parts of an embodiment of the invention may be implemented using different combinations of software, firmware, and/or hardware.

What is claimed is:

1. A method performed by a first network element coupled with a plurality of network elements within a network supporting IPv6, the method comprising:
   determining a link-layer address of a second network element in response to the second network element joining the network, the determining comprising,
      broadcasting, in response to an appropriation message from the second network element indicating an intent to use a first target IP address, a discovery message to the plurality of network elements including the second network element, wherein the discovery message indicates the first target IP address and is broadcast to request the link-layer address in association with the first target IP address.

2. The method of claim 1, wherein the determining further comprises:
   receiving a discovery response from the second network element with the link-layer address of the second network element; and
   updating a neighbor cache in the first network element with a neighbor cache entry associating the link-layer address to the first target IP address.

3. The method of claim 2, further comprising:
   receiving a data packet addressed to the first target IP address;
   utilizing the neighbor cache entry to obtain the link-layer address based on the first target IP address; and
   transmitting the data packet to the second network element based on the link-layer address obtained from the neighbor cache entry.

4. The method of claim 2, further comprising:
   receiving a data packet addressed to a second target IP address, wherein the second target IP address does not have an associated second link-layer address in the neighbor cache;
   ignoring the data packet without processing it.

5. The method of claim 4, wherein the appropriation message is a duplicate address detection (DAD) neighbor solicitation (NS), the discovery message is an NS, and the discovery response is a neighbor advertisement (NA).

6. The method of claim 2, further comprising:
   receiving a data packet addressed to a second target IP address, wherein the second target IP address does not have an entry in the neighbor cache;
   ignoring the data packet without processing it.

7. The method of claim 1, wherein the first target IP address matches a plurality of prefixes that the first network element has advertised for stateless address auto configuration, and wherein the determining further comprises:
   reacting by broadcasting a second discovery message responsive to a second appropriation message only in response to the second appropriation message indicating an intent to use a second target IP address which matches the plurality of prefixes that the first network element has advertised for stateless address auto configuration.

8. A network element, to be coupled to a network that supports IPv6, configured to receive packets, process those packets, and maintain a neighbor cache to associate internet protocol (IP) addresses of network elements of the network with their corresponding link-layer addresses, the network element comprising:
   one or more network interfaces configured to receive the packets from network elements of the network;
   a set of one or more microprocessors coupled to the one or more network interfaces; and
   a non-transitory computer readable medium, coupled with the set of microprocessors, that has stored therein instructions that, when executed by the set of microprocessors, cause the network element to,
      determine the link-layer addresses of network elements joining the network, the determination including,
         a broadcast by the network element, in response to an appropriation message that is from another network element joining the network and that indicates an intent o use a target IP address, of a discovery message to network elements of the network including the another network element, wherein the discovery message indicates the target IP address and is broadcast to request the link-layer address used by the another network element joining the network.

9. The network element of claim 8, wherein the determination further includes:
   a receipt by the network element of a discovery response that indicates an association between the target IP address and the link-layer address of the another network element joining the network, and
   an update by the network element of the neighbor cache in the network element to include a neighbor cache entry to associate the target IP address and the link-layer address of the another network element joining the network.

10. The network element of claim 9, wherein the non-transitory computer readable medium further stores therein instructions that, when executed by the set of microprocessors, cause the network element to:
    utilize, responsive to an incoming data packet that is addressed to one of the network elements as a destination network element, the neighbor cache to locate the neighbor cache entry corresponding to the destination network element; and
    transmit the incoming data packet to the destination network element based on the link-layer address obtained from the corresponding neighbor cache entry.

11. The network element of claim 9, wherein the non-transitory computer readable medium further stores therein instructions that, when executed by the set of microprocessors, cause the network element to:
    receive a data packet addressed to another target IP address, wherein the another target IP address does not have an associated link-layer address in the neighbor cache; and
    ignore the data packet without processing it.

12. The network element of claim 11, wherein the appropriation message is a duplicate address detection (DAD) neighbor solicitation (NS), the discovery message is an NS, and the discovery response is a neighbor advertisement (NA).

13. The network element of claim 9, wherein the non-transitory computer readable medium further stores therein instructions that, when executed by the set of microprocessors, cause the network element to:
    receive a data packet addressed to another target IP address, wherein the another target IP address does not have an entry in the neighbor cache; and
    ignore the data packet without processing it.

14. The network element of claim 8, wherein the target IP address matches a plurality of prefixes that the network element has advertised for stateless address auto configuration, and wherein the determination further includes:
    a reaction by the network element of a broadcast of another discovery message responsive to another appropriation message only if the another appropriation message indicates an intent to use another target IP address which matches the plurality of prefixes that the network element has advertised for stateless address auto configuration.

15. A tangible non-transitory machine-readable storage medium comprising instructions for at least one microprocessor of a processing device within a network supporting IPv6, which, when executed by the microprocessor, cause the microprocessor to perform operations comprising:
   determining a link-layer address of second network element in response to the second network element joining the network, the determining comprising,
      broadcasting, in response to an appropriation message from the second network element indicating an intent to use a first target IP address, a discovery message to a plurality of network elements including the second network element, wherein the discovery message indicates the first target IP address and is broadcast to request the link-layer address in association with the first target IP address.

16. The tangible non-transitory machine-readable storage medium of claim 15, wherein determining further comprises:
- receiving a discovery response from the second network element with the link-layer address of the second network element; and
- updating a neighbor cache with a neighbor cache entry associating the link-layer address to the first target IP address.

17. The tangible non-transitory machine-readable storage medium of claim 16, further comprising instructions to cause the microprocessor to perform operations comprising:
- receiving a data packet addressed to the first target IP address;
- utilizing the neighbor cache entry to obtain the link-layer address based on the first target IP address; and
- transmitting the data packet to the second network element based on the link-layer address obtained from the neighbor cache entry.

18. The tangible non-transitory machine-readable storage medium of claim 16, wherein the medium further comprises instructions to cause the microprocessor to perform operations comprising:
- receiving a data packet addressed to a second target IP address, wherein the second target IP address does not have an associated second link-layer address in the neighbor cache;
- ignoring the data packet without processing it.

19. The tangible non-transitory machine-readable storage medium of claim 18 wherein the appropriation message is a duplicate address detection (DAD) neighbor solicitation (NS), the discovery message is an NS, and the discovery response is a neighbor advertisement (NA).

20. The tangible non-transitory machine-readable storage medium of claim 16, wherein the medium further comprises instructions to cause the microprocessor to perform operations comprising:
- receiving a data packet addressed to a second target IP address, wherein the second target IP address does not have an entry in the neighbor cache;
- ignoring the data packet without processing it.

21. The tangible non-transitory machine-readable storage medium of claim 15, wherein the first target IP address matches a plurality of prefixes that have been advertised for stateless address auto configuration, and wherein the determining further comprises:
- reacting by broadcasting a second discovery message responsive to a second appropriation message only in response to the second appropriation message indicating an intent to use a second target IP address which matches the plurality of prefixes that have been advertised for stateless address auto configuration.

* * * * *

UNITED STATES PATENT AND TRADEMARK OFFICE
CERTIFICATE OF CORRECTION

PATENT NO.         : 8,942,234 B2                                    Page 1 of 1
APPLICATION NO.    : 14/103800
DATED              : January 27, 2015
INVENTOR(S)        : Chen It is certified that error appears in the above-identified patent and that said Letters Patent is hereby corrected as shown below:

On the Title Page, item (52), under "U.S. Cl.", in Column 1, Line 3, delete "H01L" and insert -- H04L --, therefor.

In the Claims

In Column 9, Line 61, in Claim 8, delete "intent o use" and insert -- intent to use --, therefor.

In Column 10, Line 57, in Claim 15, delete "of second" and insert -- of a second --, therefor.

Signed and Sealed this
Twenty-first Day of July, 2015

Michelle K. Lee
*Director of the United States Patent and Trademark Office*